US007813956B2

(12) United States Patent
Doerwald et al.

(10) Patent No.: US 7,813,956 B2
(45) Date of Patent: Oct. 12, 2010

(54) METHOD AND SYSTEM FOR ENHANCING CUSTOMER LOYALTY

(75) Inventors: Axel Doerwald, Belfountain (CA); Joseph Smirlies, Mississauga (CA)

(73) Assignee: Invatron Systems Corp., Mississauga, Ontario (CA)

( * ) Notice: Subject to any disclaimer, the term of this patent is extended or adjusted under 35 U.S.C. 154(b) by 2735 days.

(21) Appl. No.: 10/412,666

(22) Filed: Apr. 14, 2003

(65) Prior Publication Data
US 2004/0204992 A1 Oct. 14, 2004

(51) Int. Cl.
G06Q 30/00 (2006.01)
(52) U.S. Cl. .................................. 705/14.36
(58) Field of Classification Search ............ 705/1, 705/1.1, 14.36
See application file for complete search history.

(56) References Cited

U.S. PATENT DOCUMENTS

| 4,274,500 A | 6/1981 | Kuhnle |
| 5,747,744 A | 5/1998 | Kraft et al. |
| 6,024,149 A | 2/2000 | Bernhard et al. |
| 6,321,984 B1 * | 11/2001 | McCall et al. .............. 235/381 |
| 6,424,949 B1 | 7/2002 | Deaton et al. |
| 2003/0130891 A1 * | 7/2003 | Jacobs ........................ 705/14 |
| 2003/0130965 A1 * | 7/2003 | Jacobs et al. ................ 705/412 |

OTHER PUBLICATIONS

Peter Bacque, Weight Issue—Tech checks let truckers pass inspection quickly, Richmond Times (Jan. 11, 2001).*

* cited by examiner

Primary Examiner—Dennis Ruhl
Assistant Examiner—Paul R Fisher
(74) Attorney, Agent, or Firm—Bereskin & Parr/S.E.N.C.R.L, s.r.l.

(57) ABSTRACT

A method of and system for providing customer-specific information involving a) obtaining customer identification information for identifying a customer to be served at the weigh station; b) storing a plurality of customer profiles for a plurality of customers wherein each customer in the plurality of customers has an associated customer profile; and, c) when the customer is in the plurality of customers, retrieving the associated customer profile for the customer using the customer identification information and providing associated customer-specific information based on the associated customer profile to a weigh station display.

25 Claims, 7 Drawing Sheets

METHOD AND SYSTEM FOR ENHANCING CUSTOMER LOYALTY

FIELD OF THE INVENTION

The present invention relates generally to a method and system for enhancing customer loyalty, and more particularly relates to a method and system of enhancing customer loyalty by providing customer-specific information to a weigh station at which the customer is being served.

BACKGROUND OF THE INVENTION

Methods and systems have been devised to enhance customer loyalty to a particular provider/brand of a product or service. Such methods include issuing coupons and providing information to customers aimed at encouraging them to make purchases. These systems and methods for encouraging customer loyalty suffer from a number of disadvantages. First, with respect to coupons, the redemption rate is typically low. That is, only a very low percentage of all coupons issued are actually redeemed. This is due, in part at least, to the inconvenience that must be borne by customers, if they are to redeem coupons. Customers must save the coupons, and have them with them when making purchases. In practice, a customer having a coupon will often not have that coupon available when actually making the purchase, which may discourage the customer from making the purchase at all. In fact, a customer who otherwise had intended to make a purchase may decide not to make that purchase if they possess a redeemable coupon but do not have it at hand at that moment. As a result, the issuance of the coupon may have exactly the opposite of the desired effect.

In addition, prior art systems and methods for encouraging customer loyalty by providing information to customers suffer from a number of shortcomings. This information is typically provided by being mailed to the customer's home or by being provided at the point of sale. If the information is mailed to the customer's home, then the customer must read and remember the information and must act on it reasonably quickly. Otherwise, the information set out may no longer be correct. Often, the customer will be unsure of the information, or forget it completely, and will thus be unable to benefit from the information when actually shopping. If, on the other hand, the customer is provided with the information at the point of sale, the customer is less likely to return and do additional shopping as this will require a second wait in the queue at the point of sale, which is inconvenient.

Accordingly, there is a need for a customer loyalty system that provides customers with coupons and discounts, as well as information tailored to their particular buying patterns, in a way that makes it likely that these coupons, discounts and information will be available to customers when actually shopping, and before reaching the sales cashier.

SUMMARY OF THE INVENTION

An object of an aspect of the present invention is to provide an improved weigh scale system.

In accordance with this first aspect of the present invention, there is provided a weigh scale system. The weigh scale system comprises (a) an input module for receiving customer identification information for identifying a customer; (b) a weigh station comprising a weigh scale for determining a weight of a product, and a weigh station display for displaying information; (c) a storage module for storing a plurality of customer profiles for a plurality of customers wherein each customer in the plurality of customers has an associated customer profile; (d) an information retrieval module for receiving the customer identification information from the input module and for, when the customer is in the plurality of customers, retrieving the associated customer profile, the information retrieval module being linked for communication with the storage module and the input module; and, (e) an information processing means for, when the customer is in the plurality of customers, providing associated customer-specific information based on the associated customer profile to the weigh station display, the information processing module being linked for communication with the weigh station display and the information retrieval module.

An object of a second aspect of the present invention is to provide an improved method for providing customer-specific information for a customer to a weigh station.

In accordance with the second aspect of the present invention, there is provided a method for providing customer-specific information. The method comprises a) obtaining customer identification information for identifying a customer to be served at the weigh station; b) storing a plurality of customer profiles for a plurality of customers wherein each customer in the plurality of customers has an associated customer profile; and, c) when the customer is in the plurality of customers, retrieving the associated customer profile for the customer using the customer identification information and providing associated customer-specific information based on the associated customer profile to a weigh station display.

BRIEF DESCRIPTION OF THE DRAWINGS

A detailed description of the preferred embodiments is provided herein below with reference to the following drawings, in which.

DETAILED DESCRIPTION OF THE PREFERRED EMBODIMENTS OF THE INVENTION

Figure 1:
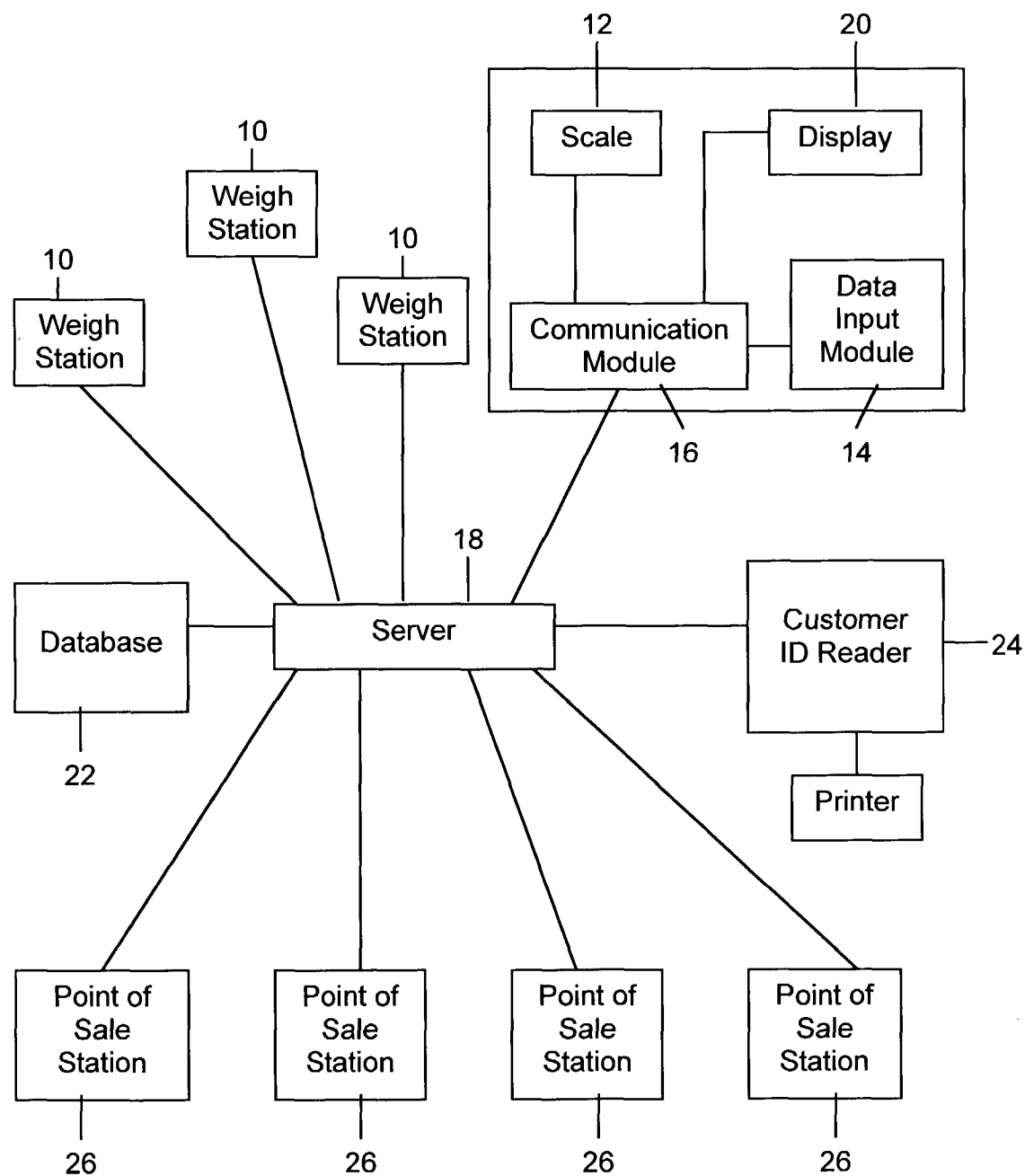
FIG. 1, in a block diagram, illustrates a system for enhancing customer loyalty in accordance with an embodiment of the invention.

Referring to FIG. 1, there is illustrated in a block diagram a system for providing information for enhancing customer loyalty. The information is provided to a weigh station 10 at which the customer is being served. Weigh stations, according to the prior art, typically include a weigh scale, a data entry means for entering information regarding a particular product, and a communication module for communicating with a server. Pricing information regarding the product is stored on the server, and is sent to the weigh scale station as required.

Referring to FIG. 1, a plurality of weigh stations 10 are shown connected to a server 18. Each weigh station 10 includes a communication module 16 for communicating with the server 18, a data input module 14 for receiving information regarding a product, a display for displaying information 20, and a scale 12 for weighing the product. The server 18 is also connected to a database 22, a customer identification reader 24, and to a plurality of point of sale stations 26.

Figure 2:
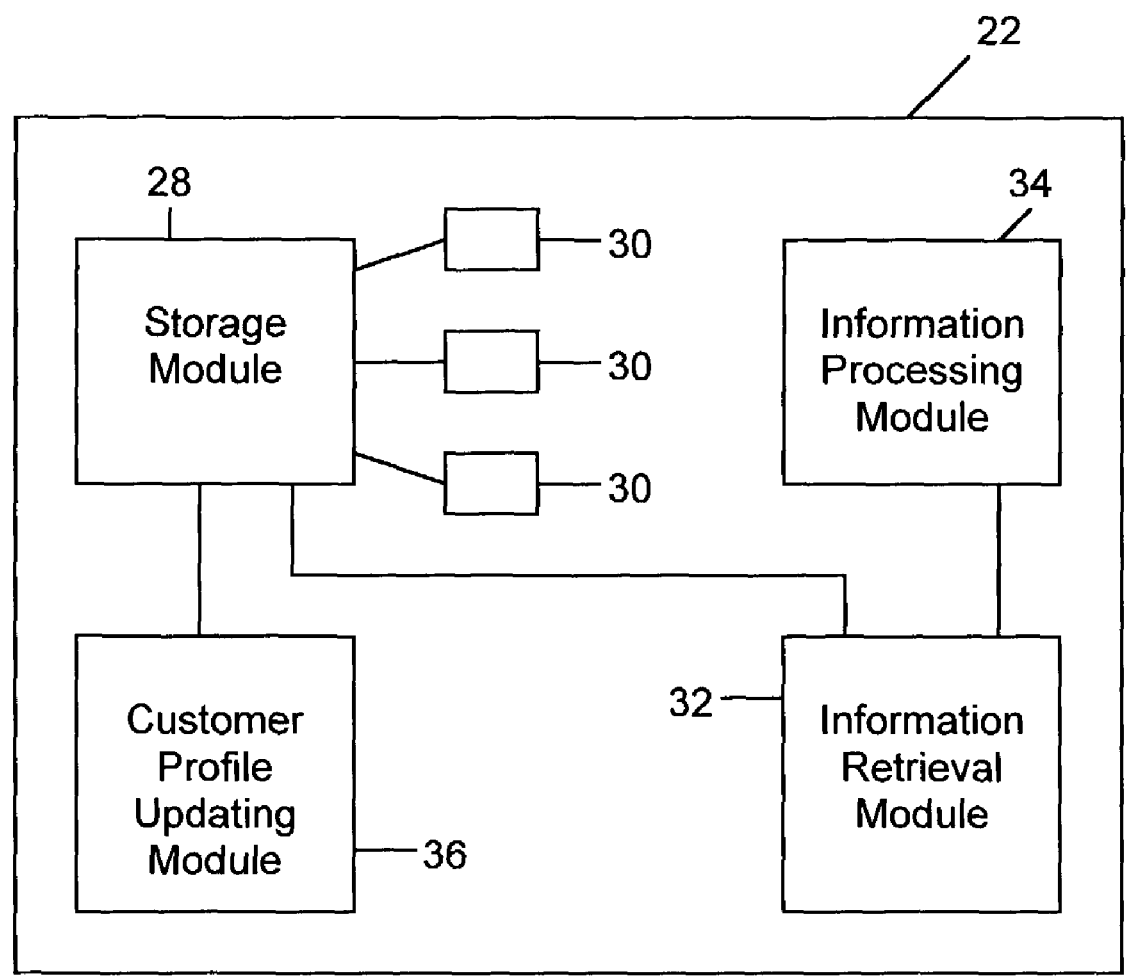
FIG. 2, in a block diagram, illustrates the server of FIG. 1.

Referring to FIG. 2, the database 22 of FIG. 1 is illustrated in more detail. The database 22 includes a storage module 28 for storing a plurality of customer profiles 30 for a plurality of customers. The database 22 also includes an information retrieval module 32 for retrieving customer profiles 30 from the storage module 28, an information processing module 34 for processing information in the customer profile 30, and a customer profile updating module 36 for updating the customer profiles 30 as required. Each of the point of sale stations 26 is connected to the server 18 to communicate purchase information to the server 18. The customer profile 30 for each customer can then be updated based on the purchase information for that customer.

Figure 3:
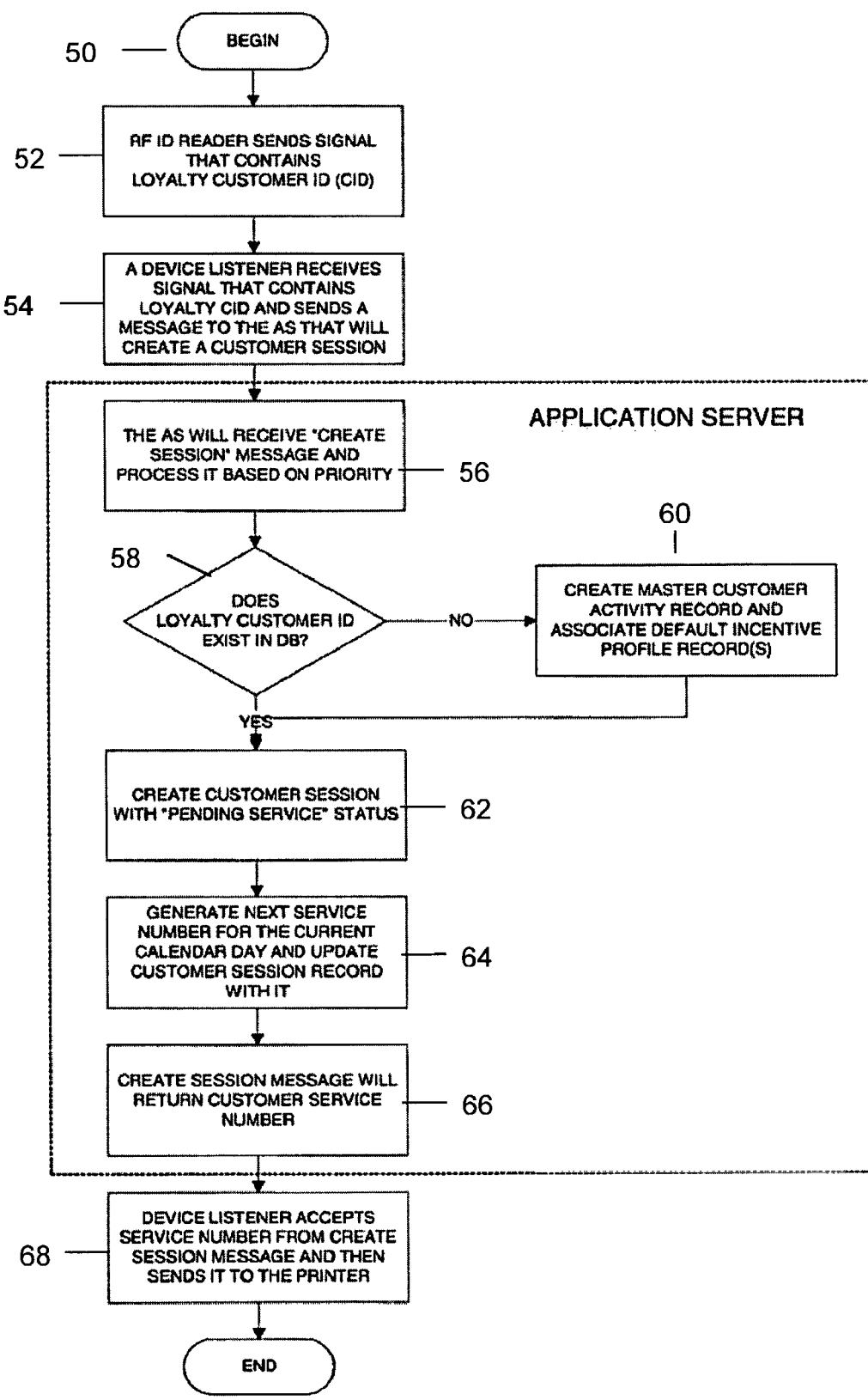
FIG. 3, in a flowchart, illustrates a method of issuing a service number and creating a customer session in accordance with an aspect of the invention.

Referring to FIG. 3, there is illustrated a method of issuing a customer service number in accordance with an aspect of the invention. The method begins at step 50 with a customer arriving at the service counter and identifying him or herself to the system in one of two ways: (1) by passing a frequent shopper or loyalty card/tag by a common reader; or (2) by presenting frequent shopper or loyalty card/tag to the customer service representative. The card or tag used may be electronically readable, by, for example, barcode or radio frequency identification. In such cases, the information is entered by passing the loyalty card/tag by a reader 24 associated with the scale 12. Alternatively, the customer service representative may manually enter the identification information. In step 52, the RF ID reader 24 (or barcode reader) sends the signal that contains the loyalty customer ID. Preferably, the loyalty customer ID comprises a unique associated customer identifier assigned to that particular customer. The unique associated customer identifier is stored in the customer profile 30 for that particular customer. In step 54, a device listener receives this signal and transmits a "create session message" signal to the application server (AS). In step 56, the application server 18 receives the create session message from the device listener and processes the message based on priority. The method then proceeds to query 58, which queries whether the loyalty customer identification exists in the database 22. If query 58 returns the answer NO, then the method proceeds to step 60 in which a master customer activity record and an associated default incentive profile record are created for the customer, then the method proceeds to step 62. If query 58 returns the answer YES, then the method proceeds to query 62 without going to step 60.

In step 62, a customer session is created having a "pending service" status. Then, in step 64, a new service number is generated for this customer session based on the current calendar day. That is, service numbers are issued for a particular calendar day. Typically, only a limited number of service numbers, say 999, will be issued such that after service number 999 is issued, the next service number issued will be 1. The customer session record is then updated using this service number. In step 66, the customer service number is returned to the device listener, and in step 68, the device listener accepts the service number from the create session message and sends the service number to the printer 38. The printer 38 prints out the service number, and provides it to the customer, before the method ends.

The foregoing method need not occur at the weigh station 10. For example, it may instead be implemented at the customer ID reader 24. One customer ID reader 24 may serve a number of different weigh stations 10. The steps of the method of FIG. 4 occur at the weigh station 10.

Figure 4:
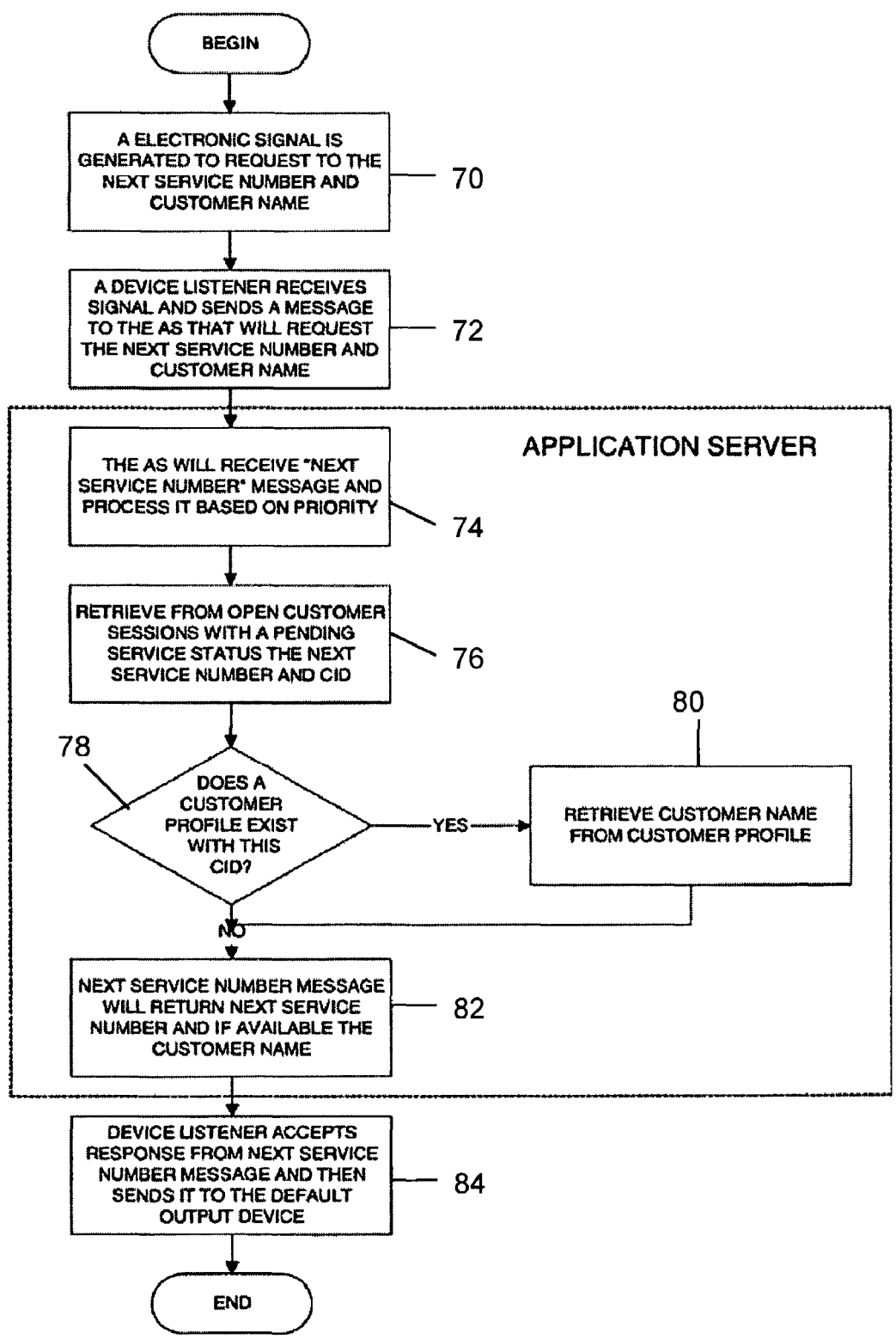
FIG. 4, in a flowchart, illustrates a method of providing a current service number and retrieving a customer profile for the customer having that service number in accordance with an aspect of the invention.

Referring to FIG. 4, there is illustrated in a flowchart a method of providing a current service number to a weigh station 10 in accordance with an aspect of the present invention. When a particular customer service session ends, the customer service representative triggers the system for the next customer to serve by sending a signal to the application server 18. The application server 18 then determines the identity of the next customer to be served, and sends a formatted message to the "next to serve" display. The method of FIG. 4 illustrates this.

In step 70, an electronic signal is generated to request the next service number and customer name from the server 18. In step 72, the device listener receives this signal and sends a "next service number" message to the application server 18 requesting the next service number and the customer name. In step 74, the application server 18 receives the "next service number" message and processes it based on priority. In step 76, the application server 18 retrieves from a list of open customer sessions having a pending service status the next service number and customer identification. Query 78 queries whether a customer profile exists for this customer identification. The query is sent to the information retrieval module of the database, which then attempts to retrieve a customer profile for this customer. If no such profile exists, then query 78 will return the answer NO. Alternatively, if this customer profile does exist, then the customer profile will be transmitted to the server 18. If query 78 returns the answer YES, the method proceeds to step 80 in which the customer's name is retrieved from the customer profile 30. The method then proceeds to step 82. If query 78 returns the answer NO, then the method proceeds immediately to step 82 without proceeding to intervening step 80. In step 82, the method returns the next service number and, if available, the customer's name. In step 84, the device listener accepts the response from the next service number message and then sends it to the default output device—in this case, the weigh station display 20. The method of FIG. 4 then terminates.

After step 84, the current service number, and if available, the customer name, will be displayed in the weigh station display 20. The customer can then identify him or herself by stepping up to the weigh station 10 and providing his or her service number printed off by the printer 38 of the customer ID reader 24. The customer then places an order with the customer service representative at the weigh station 10, beginning the method of FIG. 5.

Figure 5:
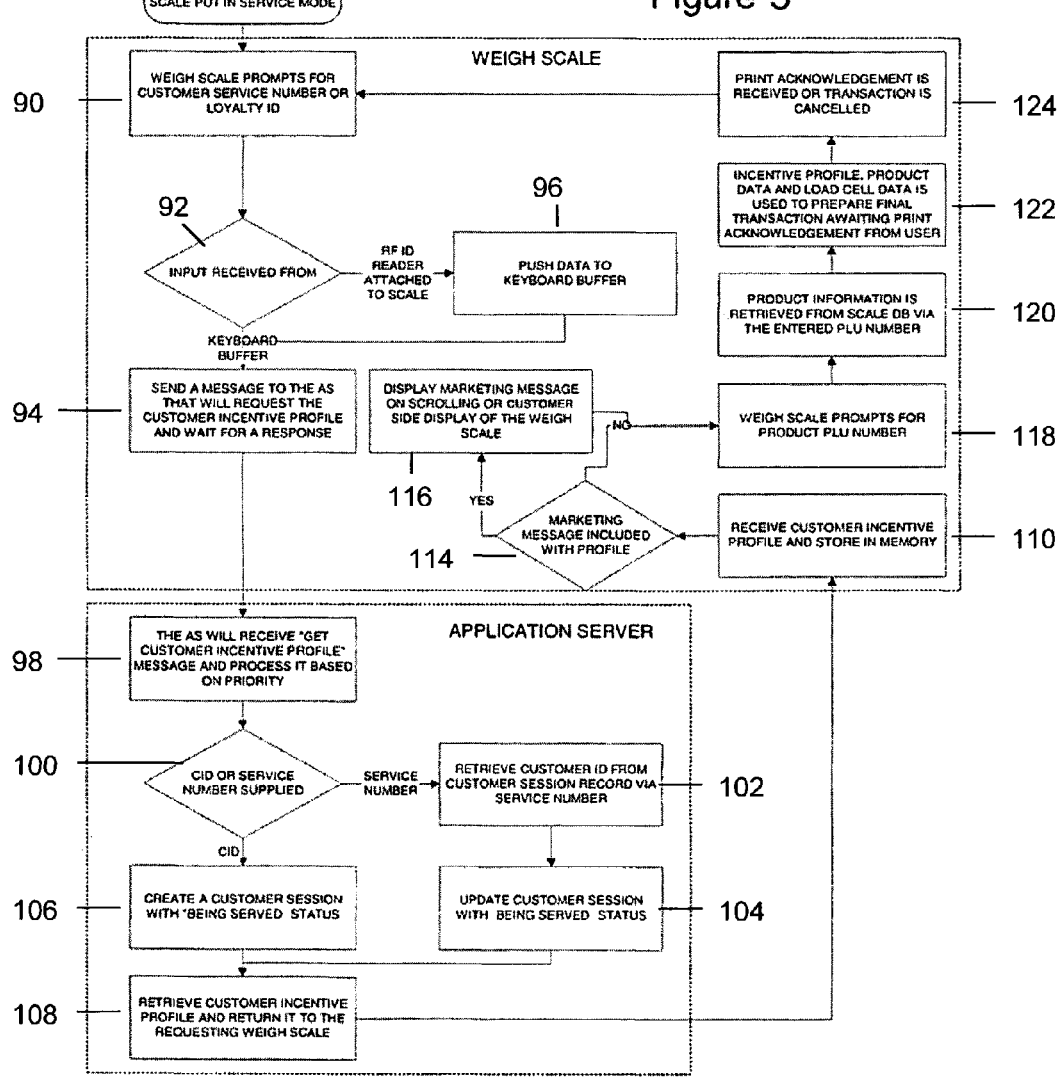
FIG. 5, in a flowchart, illustrates a method of displaying customer-specific marketing information at a weigh station in accordance with an aspect of the invention.

Referring to FIG. 5, there is illustrated in a flowchart a method of serving a customer at a weigh station 10 in accordance with the preferred embodiment of the invention. The method begins by the scale 12 being put into service mode after the customer has identified him or herself. In step 90, the weigh scale 12 then prompts for a customer service number or loyalty identification to be entered. A customer whose service number has come up, then steps up to the weigh scale 12, and enters either their customer service number, or their loyalty identification. The method then proceeds to query 92 which redirects the method depending how the input is received. If the input is customer loyalty identification read from an identification card held by the customer by a RF ID reader 24 attached to the scale 12, then the method proceeds to step 96, in which data read from the electronically readable card is pushed to the keyboard buffer before the method proceeds to step 94. If, on the other hand, the input is the customer service number, which is entered via the keyboard, then the method proceeds directly to step 94.

In step 94, a "get customer incentive profile" message is sent to the application server 18. The message requests the customer's incentive profile and awaits a response. In step 98, the application server receives the "get customer incentive profile" message and processes it based on priority. Then, either a customer identification or service number is supplied. If a service number is supplied, query 100 directs the method to step 102 in which customer identification is retrieved from the customer session record using the service number. Then, in step 104, the customer session is updated to "being served" status. The method then proceeds to step 108. If query 100 indicates that the customer identification has been provided, then the method proceeds to step 106 in which a customer session is created having the "being served" status. Then the method proceeds to step 108.

In step 108, a customer incentive profile 30 is retrieved and returned to the requesting weigh scale 12. The customer incentive profile 30 will either be the default incentive profile created in step 60, or will be the customer incentive profile retrieved from the database by the information retrieval module 32. In step 110, the customer incentive profile 30 is received at the weigh station 10 and stored in memory. If marketing information is included with the profile 30, then query 114 returns the answer YES and the method proceeds to step 116, in which the marketing message is displayed on the weigh scale display 20 at the weigh station 10. Preferably, the content of the marketing message is determined based on the customer incentive profile 30. That is, if the customer has previously purchased pickles, and pickles are on sale, then the marketing message may well include this information. After step 116, the method proceeds to step 118. If query 114 returns the answer NO (there is no marketing message included with the profile), then the method proceeds to step 118.

In step 118, the weigh scale 12 prompts the customer service representative for the product PLU number. The product PLU number is used to identify the product. The customer service representative then enters the PLU. In step 120, product information is retrieved from the database 22 for this weigh scale 12 using the PLU number. Then, in step 122, the incentive profile 30, product data and load cell data are used to prepare a final transaction awaiting print acknowledgement from this user. That is, the product data identifies the product. The load cell data determines the weight of the product. The incentive profile 30 determines the discount or coupon to be issued to the customer. Then, the system awaits instructions from the customer service representative to print the transaction record. The method then proceeds to step 124, in which the print acknowledgement is received or the transaction is cancelled. The method then goes back to step 94 for the next customer.

Figure 6:
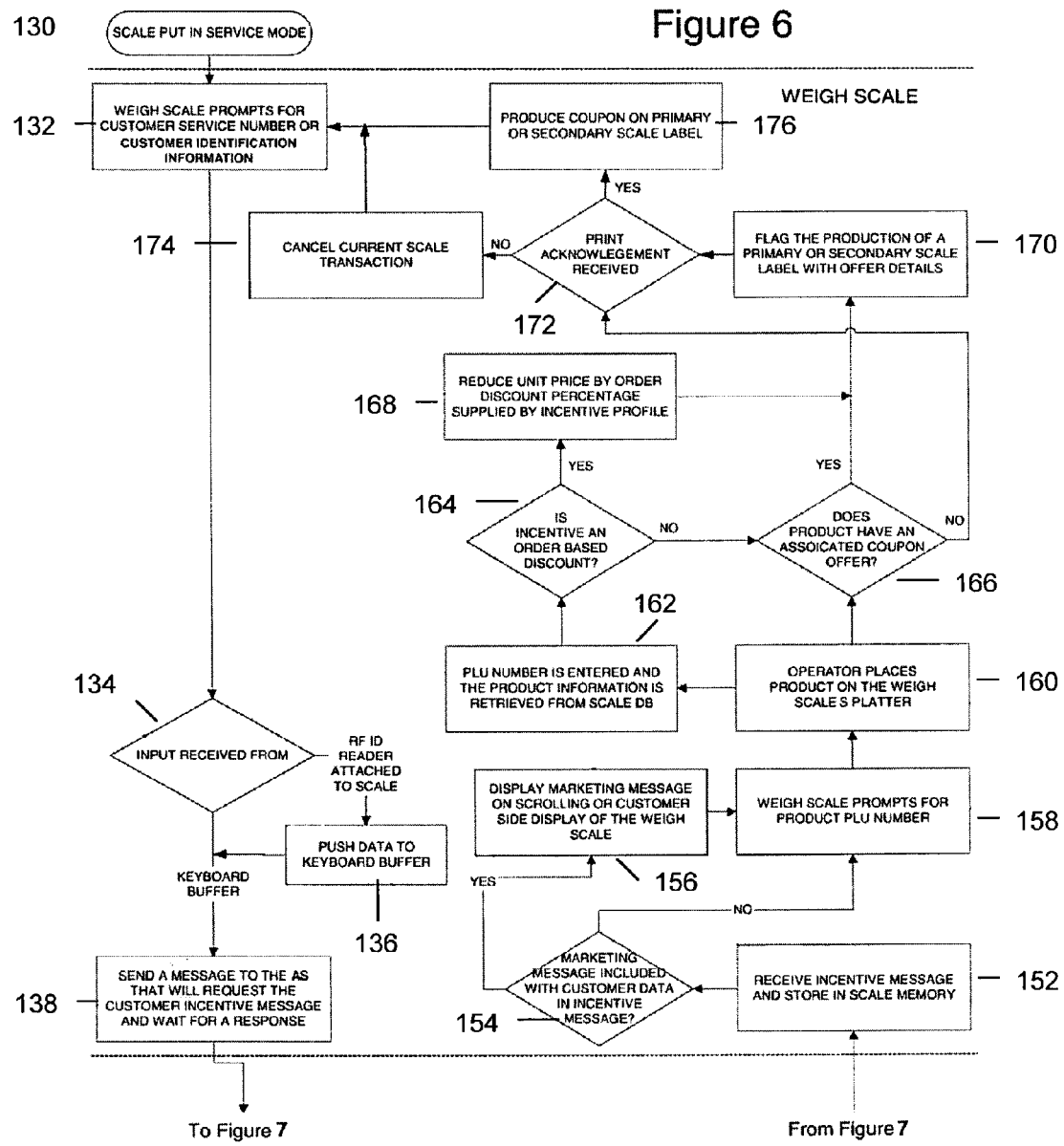
FIGS. 6 and 7, in a flowchart, illustrate a method for providing a discount or coupon to a customer at a weigh station.
Figure 7:
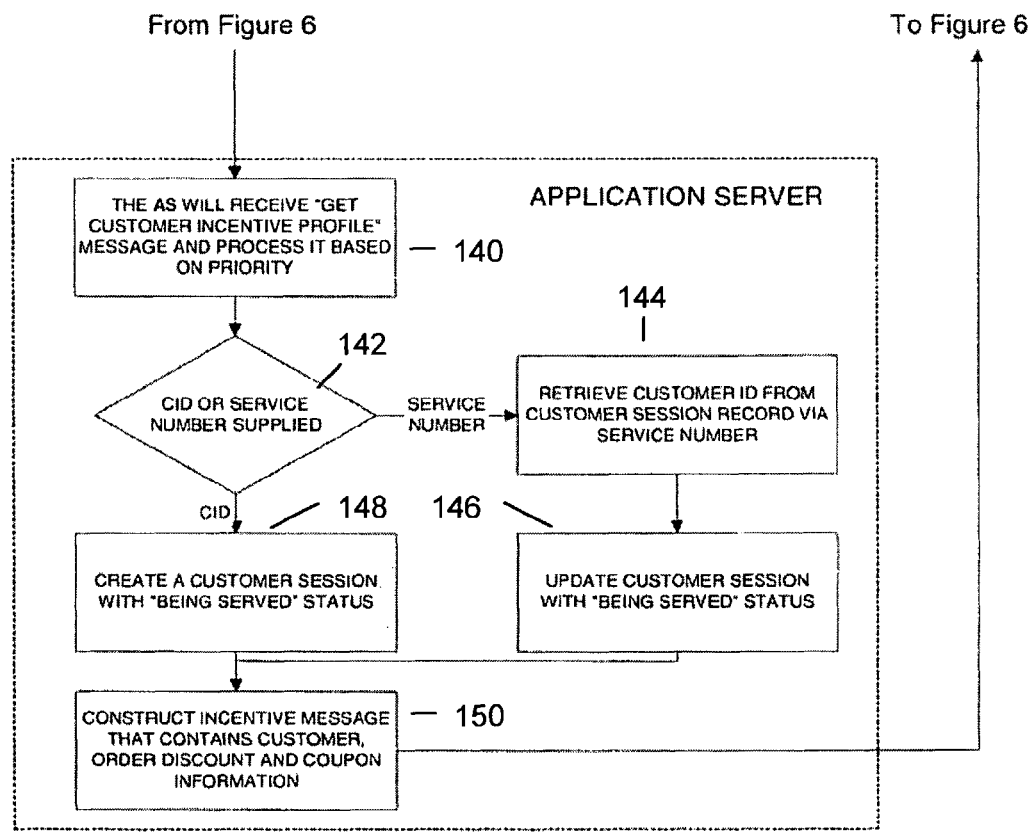

Referring to FIGS. 6 and 7, there is illustrated in flowcharts a method of serving a customer at a weigh station 10 in accordance with the preferred embodiment of the invention. The method begins in step 130 by a scale 12 being put into service mode. Then, in step 132, the weigh scale station 10 requests the customer's service number identification information. The method then proceeds to query 134, which, if the customer's identification is determined electronically by an RF ID reader 24 associated with the weigh scale station 10, redirects the method to step 136 in which the data read by the RF ID reader 24 is provided to the keyboard buffer. If, on the other hand, the customer identification information is entered manually by a customer service representative, step 136 is skipped. The method then proceeds to step 138, in which a "get customer incentive profile" message is sent to the application server 18. FIG. 6 illustrates the steps of the method that are executed at the weigh scale station 10, while FIG. 7 illustrates the steps of the method implemented at the application server 18. Accordingly, after step 138, the method proceeds from FIG. 6 to FIG. 7.

Referring to FIG. 7, in step 140, the application server 18 receives the "get customer incentive profile" message from the weigh station 10 and processes this message based on priority. The method then proceeds to query 142, which directs the method to step 144 if a service number is provided and directs the method to step 148 if the customer identification information is provided. In step 144, the customer identification is retrieved from the customer session record using the service number. Then, the method proceeds to step 146, in which the customer session is updated to have the status "being served". The method then proceeds to step 150, skipping step 148. If the customer identification is provided instead of the service number, then the method proceeds to step 148, in which a customer session is created having the "being served" status. The method then proceeds to step 150.

In step 150, an incentive message is constructed containing customer order, discount and coupon information. This information is then sent back to the weigh station 10. The incentive message is generated using the customer profile 30 as well as general information. The general information would include items that happen to be on sale for that day. Specific items are selected from the list of items on sale based on the customer profile 30 and previous purchases made by that customer. That is, if a customer has purchased items in the past, and some of these items are on sale, then the incentive message will include information regarding these items that are on sale. The incentive message will include customer-specific information. This information may include an associated time estimate information for serving the customer. This time estimate would be determined based on previous service times for that customer. Alternatively, the customer-specific information may include historical information regarding orders that customer has made in the past, so that the customer service representative has this information available when serving the customer. Typically, the customer-specific information will include reward information for that customer—different discounts or coupon values will typically be provided to different customers based on the amount of business that customer does. Finally, based on the customer profile 30, specific marketing information that is relevant to that customer may be determined, and in that case, the customer-specific information included in the incentive message will typically include this marketing information.

Referring back to FIG. 6, in step 152, the incentive message is received from the application server 18 and stored in the memory associated with the weigh scale 12. Query 154 determines whether marketing information is included with the customer data in the incentive message. If query 154 returns the answer YES, then the method proceeds to step 156, in which a marketing message is displayed by scrolling a message on the display 20 of the weigh scale 12 that is visible to the customer. The method then proceeds to step 158. If query 154 returns the answer NO, then the method proceeds directly to step 158. In step 158, the weigh scale 12 requests the product PLU number, which identifies the product. The method then proceeds to step 160, in which the operator or customer service representative places the product on the weigh scale platter to weigh the product. The method then proceeds to step 162, in which the PLU number for the product is entered and the product information is retrieved from the database 22 associated with the weigh scale 12. Query 164 then determines whether the incentive is an order-based discount. If query 164 returns the answer NO, then the method proceeds to query 166, which determines whether the product has an associated coupon offer. If query 166 returns the answer YES, then the method proceeds to step 170. If query 166 returns the answer NO, then the method proceeds to step 172.

If query 164 returns the answer YES, then the method proceeds to step 168. In step 168, the unit price is discounted by the order discount percentage supplied by the incentive profile 30. Then, the method proceeds to step 170. In step 170, the production of a primary or secondary scale transaction offer details is flagged. Then, the method proceeds to query 172. Query 172 determines if a print acknowledgement has been received. If query 172 returns the answer NO, then the current scale 12 transaction is cancelled, and the method returns to step 132. If query 172 returns the answer YES, then the method proceeds to step 176, in which a printer 38 associated with the weigh scale station 10 prints a coupon or applies a discount to the product label. Then, the method returns to step 132.

The customer profile may also be updated by the customer profile updating means 36 based on the customer-specific information included in the incentive message. That is, if, in a previous incentive message, marketing information was provided, then, in subsequent incentive messages, it may be desirable to modify or maintain the incentive message. That is, say that a specific customer is known to purchase smoked meats. Based on this information, the incentive message provided includes information that a particular mustard is on sale. When the customer purchases this mustard, this information is recorded in the customer profile. Then, a week later, the customer returns to the store. At that point, the mustard is still on sale. However, if a large quantity of mustard has been purchased by this customer, then it may not be desirable to provide this information to the customer once again. Instead, other information, such as information, say, that pickles are on sale, might be more usefully provided. Accordingly, the customer profile 30 may be updated based not only on associated purchase information for the customer, but also based on marketing information and other information previously supplied to the customer.

Preferably, after step 176, the customer profile 30 stored in the database 22 is updated to reflect the transaction thus concluded. According to another preferred embodiment of the invention, this does not occur at the weigh scale station 10, but instead occurs at the point of sale station 26. That is, it is always possible, though unlikely, that a customer will not actually purchase an item, despite being issued the item together with a coupon at the weigh station 10. To guard against a customer inappropriately being awarded points at that point, the customer profile 30 may not be updated after step 176, but may instead be updated when the customer purchases the item at the point of sale station 26.

According to a further aspect of the invention, customers are awarded reward points based on their previous purchases. This information is stored in the customer profile 30. According to this aspect of the invention, the incentive message generated includes the number of reward points available to this customer. This information will be displayed to the customer service representative at the weigh station 10, together with information on whether these reward points are redeemable vis-à-vis the product being weighed. If the reward points are redeemable vis-à-vis the product being weighed, then the customer service representative can ask the customer whether he or she wishes to redeem some or all of these reward points. The customer can then choose to redeem some selected number of reward points from an associated total number of reward points specified in the associated reward information stored for that customer in the customer profile 30. Then, an associated value can be determined that is represented by this selected number of reward points, and either a coupon or a discount provided for the product. The value of the coupon or discount will be the associated value represented by the selected number of reward points. Subsequently, the customer profile 30 will be updated to reflect the fact that a selected number of reward points have been redeemed. In other words, the total number of reward points will be reduced by the associated selected number of reward points.

Other variations and modifications of the invention are possible. For example, the invention may be implemented without issuing service numbers. Instead, a customer may simply identify him or herself at the weigh station 10, and then using this identification, a suitable incentive message can be provided to the weigh station 10 based on a profile 30 stored for that customer. All such modifications or variations are believed to be within the sphere and scope of the invention as defined by the claims appended hereto.

The invention claimed is:

1. A method for providing customer-specific information for a customer to a weigh station, the method comprising: a) obtaining customer identification information for identifying a customer to be served at the weigh station; b) storing a plurality of customer profiles for a plurality of customers wherein each customer in the plurality of customers has an associated customer profile; and, c) when the customer is in the plurality of customers, retrieving the associated customer profile for the customer using the customer identification information and providing associated customer-specific information based on the associated customer profile to a weigh station display, wherein the associated customer profile comprises, for each customer in the plurality of customers, a unique associated customer identifier, the customer-specific information comprises associated reward information, and the associated reward information specifies at last one of an associated coupon and an associated discount to be provided to the customer.

2. The method as defined in claim 1, wherein step (c) comprises, when the customer is not in the plurality of customers, generating a customer profile for the customer and providing default information to the weigh station display.

3. The method as defined in claim 1, wherein the customer-specific information comprises at least one of associated time estimate information for serving the customer, associated historical order information for the customer, associated reward information for the customer, and associated marketing information oriented to the customer.

4. The method as defined in claim 1 further comprising providing, for each customer in the plurality of customers, an associated identification card for providing the unique associated customer identifier for the customer.

5. The method as defined in claim 1 further comprising obtaining associated purchase information for the customer and updating the associated customer profile for the customer based on the associated purchase information.

6. The method as defined in claim 1 further comprising updating the associated customer profile for each customer based on the associated customer-specific information.

7. The method as defined in claim 1 further comprising providing an associated service number to the customer, linking the associated service number with the unique associated customer identifier, and inputting the associated service number at the weigh station, wherein step (c) comprises using the associated service number to retrieve the associated customer profile.

8. The method as defined in claim 1, wherein the customer-specific information comprises associated reward point information for the customer; and, the method further comprises: selectably redeeming an associated selected number of reward points from an associated total number of reward points specified by the associated reward point information for the customer; determining an associated value represented by the selected number of points; issuing at least one of an associated coupon and an associated discount to the customer, the at least one of an associated coupon and an associated discount being of the associated value; and updating the customer profile for the customer by reducing the associated total number of reward points by the associated selected number of reward points.

9. The method as defined in claim 1, wherein step (c) comprises determining an associated value of the at least one of the associated coupon and the associated discount.

10. The method as defined in claim 9 further comprising obtaining identification information for the product, determining the weight of the product; and, determining associated reward information based on the associated customer profile, product identification information and the weight of the product.

11. The method as defined in claim 10, wherein the information processing module comprises a product correlating means for correlating at least one associated product with the product; and, when the customer is in the plurality of customers, the associated reward information specifies an associated coupon for the associated product; and, the weigh scale station comprises a printing module for printing the associated coupon for the associated product.

12. A system for enhancing customer loyalty, the system comprising: an input module for receiving customer identification information for identifying a customer; a weigh station comprising a weigh scale for determining a weight of a product, and a weigh station display for displaying information; a storage module for storing a plurality of customer profiles for a plurality of customers wherein each customer in the plurality of customers has an associated customer profile; an information retrieval module for receiving the customer identification information from the input module and for, when the customer is in the plurality of customers, retrieving the associated customer profile, the information retrieval module being linked for communication with the storage module and the input module; and, an information processing means for, when the customer is in the plurality of customers, providing associated customer-specific information based on the associated customer profile to the weigh station display, the information processing module being linked for communication with the weigh station display and the information retrieval module; wherein the customer-specific information comprises, for each customer in the plurality of customers, a unique associated customer identifier, and the associated customer-specific information comprises associated reward information, and the associated reward information specifies at least one of an associated coupon and an associated discount to be provided to the customer.

13. The system as defined in claim 12 further comprising a customer profile updating means for updating the associated customer profile for each customer in the plurality of customers based on at least one of the associated customer-specific information and associated purchase information for the customer.

14. The system as defined in claim 12, wherein the customer-specific information comprises associated reward point information for the customer.

15. The system as defined in claim 12, wherein the associated customer profile comprises at least one of associated time estimate information for serving the customer, associated historical order information for the customer, associated reward information for the customer, and associated marketing information oriented to the customer.

16. The system as defined in claim 15 further comprising a customer profile updating means for, when the customer is not in the plurality of customers, adding the customer to the plurality of customers and generating an associated customer profile for the customer.

17. The system as defined in claim 16, wherein the weigh station comprises a communication module for communicating with a server associated with the storage module, the information retrieval module and the information processing module.

18. The system as defined in claim 17 further comprising a point-of-sale station for obtaining associated purchase information from the customer and for transmitting the associated purchase information to the server, wherein the point-of-sale station is connected to the server for communication therewith, and the customer profile updating means is operable to update the associated customer profile for the customer based on the associated purchase information.

19. The system as defined in claim 18 further comprising a plurality of weigh stations, and a plurality of point-of-sale stations connected to the server.

20. The system as defined in claim 19, wherein the input module comprises a service number provider for providing an associated service number to the customer, linking the associated service number with the unique associated customer identifier, and transmitting the associated service number and the unique associated customer identifier to the information retrieval module; each weigh station in the plurality of weigh stations comprises an associated information input means for inputting the associated service number into the communication module for transmission to the information processing module; and the information processing module is operable, when the associated service number is received from a weigh station in the plurality of weigh stations, to provide to the weigh station display the associated customer-specific information for the customer identified by the unique associated customer identifier linked to the associated service number.

21. The system as defined in claim 15 further comprising, for each customer in the plurality of customers, an associated identification card for identifying the customer.

22. The system as defined in claim 21, wherein, for each customer in the plurality of customers, the associated identification card is electronically-readable and the input module is operable to read the unique associated customer identifier from the electronically-readable identification card.

23. The system as defined in claim 12, wherein an associated value of the at least one of the associated coupon and the associated discount is based on the associated customer profile.

24. The system as defined in claim 23, wherein each weigh station comprises an associated information receiving module for receiving product identification information for the product, and is operable to transmit the product identification information for the product and the weight of the product to the information processing module; and, the associated value is based on the associated customer profile, the product identification information and the weight of the product.

25. The system as defined in claim 24, wherein the information processing module comprises a product correlating means for correlating at least one associated product with the product; the associated reward information specifies an associated coupon for the at least one associated product; and, the weigh scale station further comprises a printing module for printing the associated coupon for the at least one associated product.

* * * * *